United States Patent [19]
Barcza

[11] Patent Number: 5,794,851
[45] Date of Patent: Aug. 18, 1998

[54] NOZZLE SEALING APPARATUS

[75] Inventor: William Kevin Barcza, Palm City, Fla.

[73] Assignee: United Technologies Corporation, Hartford, Conn.

[21] Appl. No.: 570,172

[22] Filed: Dec. 7, 1995

[51] Int. Cl.⁶ .................................................. B64D 33/08
[52] U.S. Cl. ........................... 239/127.3; 239/265.35; 60/230
[58] Field of Search ................ 239/265.35, 265.34, 239/127.3; 60/270–272, 228–230

[56] References Cited

U.S. PATENT DOCUMENTS

| | | | |
|---|---|---|---|
| 4,081,137 | 3/1978 | Sutton et al. | 239/127.3 |
| 4,544,098 | 10/1985 | Warburton | 239/127.3 |
| 4,773,593 | 9/1988 | Auxier et al. | 60/262 |
| 5,082,182 | 1/1992 | Bruchez et al. | 239/265.35 |
| 5,232,158 | 8/1993 | Barcza | 239/265.35 |
| 5,255,849 | 10/1993 | Mayer et al. | 239/127.3 |
| 5,285,637 | 2/1994 | Barcza | 60/230 |
| 5,335,489 | 8/1994 | Thayer | 60/230 |

*Primary Examiner*—Kevin Weldon
*Attorney, Agent, or Firm*—Richard D. Getz

[57] ABSTRACT

A nozzle for a gas turbine engine is provided which includes an outer casing, a convergent section, a divergent section, an external fairing, and apparatus for sealing between the external fairing and the divergent section. The convergent section communicates with the augmentor on one end and with the divergent section on the opposite end. The end of the divergent section opposite that attached to the convergent section is pivotly attached to the external fairing. The divergent section includes a plurality of divergent flaps and divergent flap seals circumferentially spaced. The apparatus for sealing between the external fairing and the divergent section attaches to the divergent flaps and divergent flap seals and mates with the external fairing.

19 Claims, 2 Drawing Sheets

NOZZLE SEALING APPARATUS

BACKGROUND OF THE INVENTION

1. Technical Field

This invention relates to gas turbine engines having convergent/divergent nozzles in general, and apparatus for sealing within nozzles in particular.

2. Background Information

Augmented gas turbine engines generally include some type of downstream nozzle to optimize the thrust produced within the engine. Convergent/divergent (C/D) nozzles, for example, are often used because of the variety of nozzle configurations possible. Flaps circumferentially distributed aft of the augmentor form the convergent and divergent sections for which the nozzle is named. Flap seals disposed between adjacent flaps minimize gas leakage between flaps in both sections. The convergent section is pivotly connected to the augmentor and to the divergent section. The divergent section is pivotly connected to the convergent section and to an external fairing positioned radially outside of the divergent flaps. The opposite ends of the external flaps are pivotly attached to a static outer casing which surrounds a portion of the nozzle. Together, the outer casing, the convergent and divergent sections, and the external fairing form a plenum hereinafter referred to as the "nozzle plenum".

Because of the high temperature of the core gas exiting the augmentor and combustors, nozzles are cooled with air bled off of the fan at a lower temperature and a higher pressure than that of the core gas flow passing through the nozzle. The cooling air exits the augmentor and enters the nozzle as a layer of cooling air traveling along the surface of the nozzle flaps and flap seals. The opposite side of the flaps and flap seals are cooled by cooling air within the nozzle plenum.

Two significant disadvantages are common to most implementations of this nozzle cooling approach. First, cooling air that exits the augmentor liner and passes through the nozzle as a layer, increases in temperature in the direction away from the augmentor. At the same time the temperature increases, the geometry of the layer erodes and further inhibits the transfer of heat between the cooling air and the nozzle. As a result, adequate cooling air flow for the convergent section may be insufficient for the divergent section. If the cooling air flow is increased to meet the minimum required for the divergent section, an excessive amount would be used to cool the convergent section. Second, in most presently available nozzles cooling air within the nozzle plenum can readily escape at the joint between the external fairing and the divergent section. Hence, it is necessary to provide more cooling air to the nozzle plenum than might be otherwise required. A person of skill in the art will recognize that it is a distinct advantage to minimize the amount of bled cooling air used within a gas turbine engine.

What is needed is a nozzle that provides adequate cooling for the convergent and divergent sections and one that uses minimal cooling air.

DISCLOSURE OF THE INVENTION

It is, therefore, an object of the present invention to provide a nozzle that requires minimal cooling air.

It is another object of the present invention to provide a nozzle that adequately cools the divergent flaps and flap seals.

It is still another object of the present invention to provide a sealing apparatus for a nozzle that is effective for multiple nozzle positions.

It is still another object of the present invention to provide a sealing apparatus that is easily manufactured and implemented.

According to the present invention, a nozzle for a gas turbine engine is provided which includes an outer casing, a convergent section, a divergent section, an external fairing, and apparatus for sealing between the external fairing and the divergent section. The convergent section communicates with the augmentor on one end and with the divergent section on the opposite end. The end of the divergent section opposite that attached to the convergent section is pivotly attached to the external fairing. The divergent section includes a plurality of divergent flaps and divergent flap seals circumferentially spaced. The apparatus for sealing between the external fairing and the divergent section attaches to the divergent flaps and divergent flap seals and mates with the external fairing.

According to one aspect of the present invention, the divergent flaps include ejector slots through which cooling air may pass. The slots are oriented such that cooling air may pass from the nozzle plenum, through the divergent flap, and travel along the surface of the flap as a layer before mixing with the passing core gas flow.

According to another aspect of the present invention, the divergent flap seals include ejector slots through which cooling air may pass. The slots are oriented such that cooling air may pass from the nozzle plenum, through the divergent flap seal, and travel along the surface of the divergent flap seal as a layer before mixing with the passing core gas flow.

An advantage of the present invention is that it uses minimal cooling air. Cooling air is bled off of a fan or compressor stage or is captured by flaps external to the aircraft. In the former case, work done to increase the pressure of the cooling air by the fan and/or compressor does not add to the thrust of the engine and therefore decreases the efficiency of the engine. In the latter case, the external flaps produce an undesirable drag on the aircraft. Hence, it is a significant advantage to minimize the amount of cooling air required.

The present invention also provides improved cooling for the divergent section of the nozzle. Most prior art nozzle cooling schemes use cooling air emanating from the augmentor liner to cool the hot side of downstream convergent and divergent nozzle components. The present invention, in contrast, cools the hot side of the convergent and divergent sections with cooling air emanating from the augmentor liner and adds additional air to cool the divergent section through ejector slots within the divergent section.

These and other objects, features and advantages of the present invention will become apparent in light of the detailed description of the best mode embodiment thereof, as illustrated in the accompanying drawings.

BEST MODE FOR CARRYING OUT THE INVENTION

Figure 1:
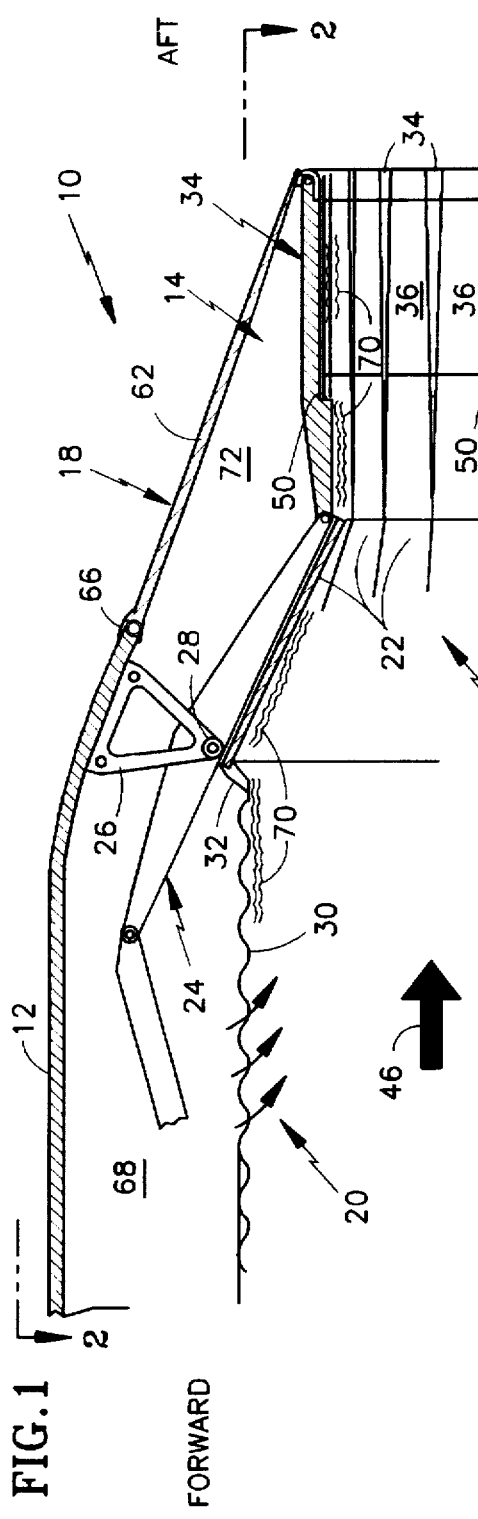
FIG. 1 is a diagrammatic sectional view of a gas turbine engine nozzle.

Referring to FIG. 1, a nozzle 10 for a gas turbine engine is shown having an outer casing 12, a divergent section 14, a convergent section 16, and an exterior fairing 18. An augmentor 20 is partially shown forward of the nozzle 10 adjacent the convergent section 16. The convergent section 16 of the nozzle 10 is forward of the divergent section 14 and the intersection between the two sections 14,16 forms the throat of the convergent/divergent nozzle 10. The outer casing 12 is a static structure that surrounds the augmentor 20 and a portion of the nozzle 10.

The convergent section 16 of the nozzle 10 includes a plurality of convergent flaps 22 and convergent flap seals (not shown) circumferentially distributed about the aft of the augmentor 20. The convergent flaps 22 are attached to pivotable linkages 24 which are attached to brackets 26 mounted on the outer casing 12. The pivot point 28 of each linkage 24 is adjacent the intersection between the augmentor liner 30 and the convergent flaps 22. The position of the linkage pivot points 28 enables the convergent flaps 22 to pivot relative to the augmentor liner 30 as though they were pivotly attached to the augmentor liner 30. Finger seals 32 seal the intersection between the augmentor liner 30 and the convergent flaps 22.

Figure 5:
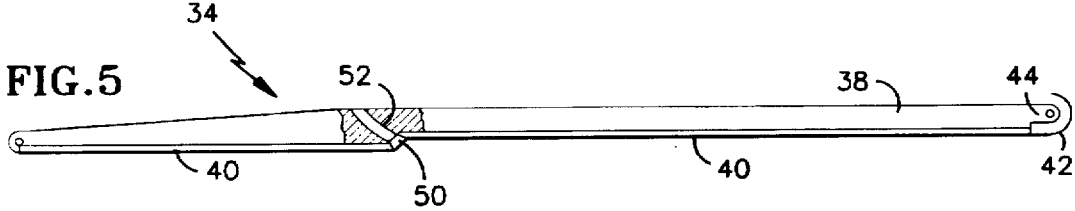
FIG.5 is a diagrammatic view of a divergent flap.

Referring to FIGS. 1 and 5, the divergent section 14 of the nozzle 10 includes a plurality of divergent flaps 34 and divergent flap seals 36 circumferentially distributed about the aft of the convergent section 16 and pivotly attached to the linkages 24 supporting the convergent flaps 22. The opposite end of the divergent flaps 34 are pivotly attached to the exterior fairing 18. Each divergent flap 34 includes a body 38, a hot sheet 40, an aft extension 42, and an aft pivot 44. The hot sheet 40 is attached to the body 38 on the side exposed to core gas flow 46 and the aft pivot 44 extends out from the aft end of the body 38. The aft extension 42 extends out from the hot sheet 40 of the flap 34 and curves upward around the aft pivot 44. In an alternative embodiment, each divergent flap 34 includes an ejector slot 50 disposed in the hot sheet 40 of the flap 34. A cooling air passage 52 through the body 38 of the divergent flap 34 allows cooling air to pass through the slot 50.

Figure 4:
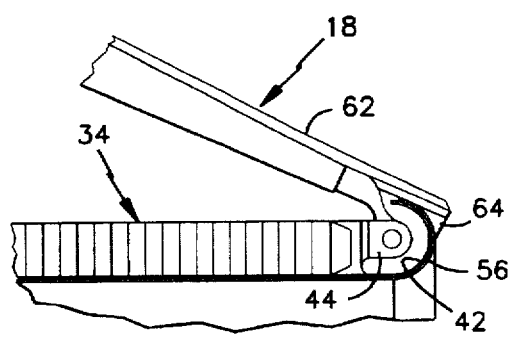
FIG.4 is an enlarged partial view of the nozzle shown in FIG. 1.
Figure 6:
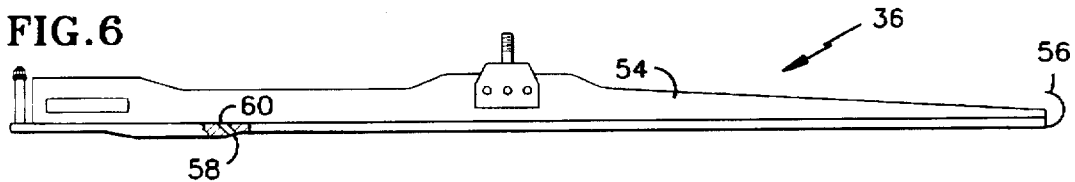
FIG.6 is a diagrammatic view of a divergent flap seal.

Referring to FIGS. 1,4, and 6, the divergent flap seals 36 are disposed circumferentially between and radially inward of the divergent flaps 34, overlapping a portion of each adjacent divergent flap 34. Each divergent flap seal 36 includes a body 54 and an aft extension 56. The aft extension 56 curves away from the body 54 of the seal 36 in a manner similar to the aft extension 42 of the divergent flaps 34, but at a slightly larger curvature radius. In an alternative embodiment, each divergent flap seal 36 includes an ejector slot 58. A cooling air passage 60 through the body 54 of each divergent flap seal 36 allows cooling air to pass through the ejector slot 58.

Figure 2:
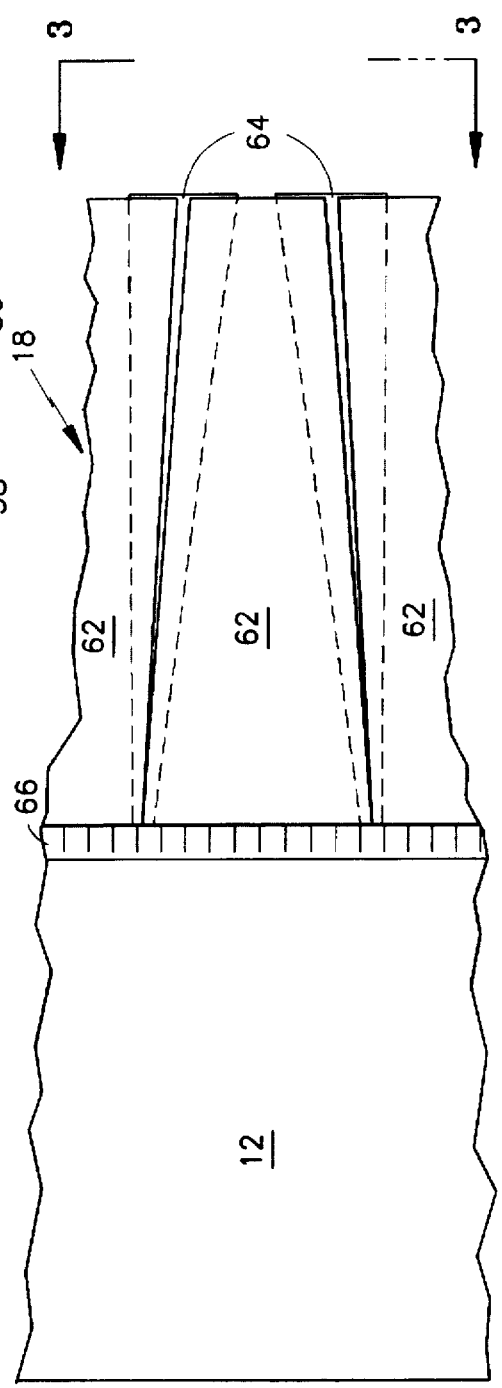
FIG.2 is a diagrammatic partial top view of the nozzle shown in FIG. 1.

Referring to FIGS. 1,2, and 4, the exterior fairing 18 includes a plurality of exterior flaps 62 and exterior flap seals 64 arranged in a manner similar to that of the divergent section flaps 34 and flap seals 36. The aft end of the exterior flaps 62 are pivotly attached to the divergent flaps 34. The forward end of the exterior flaps 62 are pivotly attached to the outer casing 12. Finger seals 66 at the junction of the exterior fairing 18 and the outer casing 12 minimize cooling air leakage between the exterior fairing 18 and the outer casing 12.

Referring to FIG. 1, in the operation of the engine cooling air at a lower temperature and higher pressure than the core gas flow 46 is bled off of the fan and/or compressor (not shown) and passed into the annulus 68 formed between the augmentor liner 30 and the outer casing 12. A percentage of the cooling air bleeds out of the annulus 68 through the apertures in the augmentor liner 30 and forms a layer 70 disposed between the augmentor liner 30 and the core gas flow 46. The layer 70 continues downstream passing over the convergent section flaps 22, transferring heat away from the augmentor liner 30 and convergent section 16 along the way. The remaining cooling air within the annulus 68, less that lost to leakage, passes into the nozzle plenum 72 formed by the convergent 16 and divergent 14 sections, the outer casing 12, and the exterior fairing 18.

Cooling demands within the nozzle 10 require a minimum cooling air flow through the nozzle 10. The minimum is defined as the amount of cooling air required for heat transfer purposes and any cooling air leakage that is concomitant with providing the cooling air required for heat transfer. Hence, reducing the concomitant leakage reduces the minimum cooling air flow necessary within the nozzle. The aft extensions 42,56 (see FIG.4) of the divergent flaps 34 and flap seals 36 help minimize the undesirable concomitant cooling air leakage by sealing between the divergent section 14 and the external fairing 18.

Figure 3:
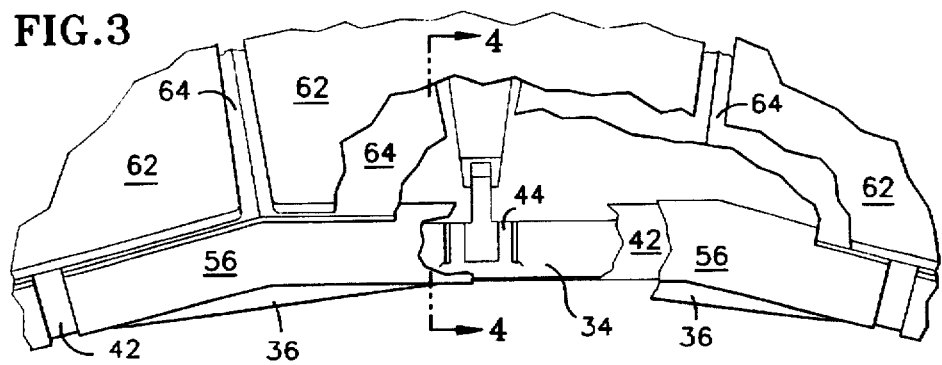
FIG.3 is a diagrammatic partial end view of the nozzle shown in FIG.2, partially cut-a-way.

Referring to FIGS. 3 and 4, the aft extensions 42,56 of the divergent flaps 34 and flap seals 36 help minimize leakage by providing a continuous sealing surface extending around the entire circumference of the divergent section 14 that mates with the external flaps 62 and flap seals 64. The continuous sealing surface is formed by the aft extensions 42 of the divergent flaps 34 being received within the aft extensions 56 of the divergent flap seals 36. The aft extension 56 of each divergent flap seal 36 receives a portion of the aft extension 42 from each adjacent divergent flap 34. Closing and opening the divergent section 14 causes the aft extensions 42 of the divergent flaps 34 to slide into and out of the aft extensions 56 of adjacent divergent flap seals 36, respectively. The aft extensions 42 of the divergent flaps 34 are sufficiently received within the aft extensions 56 of the divergent flap seals 36 to prevent one from disengaging with the another, regardless of the position of the divergent section 14.

Referring to FIG.1, in the embodiment including ejector slots 50,58 disposed within the divergent section 14, a portion of the cooling air within the nozzle plenum 72 passes out into the core gas flow 46 through the ejector slots 50,58. The cooling gas exits the divergent flaps 34 and flap seals 36 and augments the layer 70 passing down from the convergent section 16, thereby increasing the heat transfer away from the divergent section 14.

Although this invention has been shown and described with respect to the detailed embodiments thereof, it will be understood by those skilled in the art that various changes in form and detail thereof may be made without departing from the spirit and the scope of the invention. For example, the best mode geometry of the divergent flap 34 and flap seal 36 aft extensions 42,56 has been explained as being curved. In alternative embodiments, other mating geometries may be used.

I claim:

1. A nozzle for a gas turbine engine, comprising:
   an outer casing;
   a convergent section;
   a divergent section, having:
      a plurality of divergent flaps, each having a forward end pivotly connected to said convergent section, an aft end, and a flap aft extension extending out from said flap aft end; and
      a plurality of divergent flap seals, each having a forward end, an aft end, and a flap seal aft extension extending out from said flap seal aft end;

wherein said divergent flaps are circumferentially spaced around said convergent section and said divergent flap seals are disposed circumferentially between and radially inward of said divergent flaps; and an external fairing, pivotly connected on a first end to said divergent flaps and on a second end to said outer casing, said external fairing disposed radially outside of said divergent section;

wherein said flap aft extensions and said flap seal aft extensions mate with said external fairing, thereby sealing between said divergent section and external fairing.

2. A nozzle according to claim 1, wherein one of said flap aft extensions or flap seal aft extensions is slidably received within the other of said flap aft extensions or flaps seal aft extensions.

3. A nozzle according to claim 2, wherein said flap aft extensions and said flap seal aft extensions are arcuately shaped.

4. A nozzle according to claim 3, wherein said flap aft extensions are received within said flap seal aft extensions.

5. A nozzle according to claim 4 wherein said divergent flaps further comprise an ejector slot disposed between said aft and forward ends, wherein said slot provides a passage through which cooling air may pass.

6. A nozzle according to claim 5 wherein said divergent flap seals further comprise an ejector slot disposed between said aft and forward ends, wherein said slot provides a passage through which cooling air may pass.

7. A nozzle according to claim 2, wherein said external fairing comprises:

a plurality of external flaps; and a plurality of external flap seals, disposed circumferentially between and radially inward of said external flaps.

8. A nozzle according to clam 7 wherein said flap aft extensions and said flap seal aft extensions are arcuately shaped.

9. A nozzle according to claim 8 wherein said flap aft extensions are received within said flap seal aft extensions.

10. A nozzle according to claim 9, wherein said divergent flaps further comprise an ejector slot disposed between said aft and forward ends, wherein said slot provides a passage through which cooling air may pass.

11. A nozzle according to claim 10 wherein said divergent flap seals further comprise an ejector slot disposed between said aft and forward ends, wherein said slot provides a passage through which cooling air may pass.

12. An apparatus for sealing within a nozzle having an external fairing pivotly attached to a divergent section, comprising:

a first aft extension, attached to a divergent flap within the divergent section; and a second aft extension, attached to a divergent flap seal within the divergent section;

wherein said first and second aft extensions mates with said external fairing, thereby sealing between said divergent section and said external fairing.

13. A nozzle according to claim 12, wherein one of said first or second aft extensions are slidably received within the other of said first or second aft extensions.

14. A nozzle according to claim 13, wherein said first and second aft extensions are arcuately shaped.

15. A nozzle according to claim 14, wherein said first aft extensions are received within said second aft extensions.

16. A nozzle for a gas turbine engine, comprising:

an outer casing;

a divergent section, having:

a plurality of divergent flaps, each having a forward end pivotly connected within said outer casing, an aft end, and a flap aft extension extending out from said divergent flap aft end; and a plurality of divergent flap seals, each having a forward end, an aft end, and a flap seal aft extension extending out from said divergent flap seal aft end;

wherein said divergent flaps are circumferentially spaced within said outer casing and said divergent flap seals are disposed circumferentially between and radially inward of said divergent flaps; and an external fairing, pivotly connected on a first end to said divergent flaps and on a second end to said outer casing, said external fairing disposed radially outside of said divergent section;

wherein said aft extensions of said divergent flaps and divergent flap seals mate with said external fairing, thereby sealing between said divergent section and said external fairing.

17. A nozzle according to claim 16, wherein one of said flap aft extensions or flap seal aft extensions is slidably received within the other of said flap aft extensions or flap seal aft extensions.

18. A nozzle according to claim 17, wherein said flap aft extensions and flap seal aft extensions are arcuately shaped.

19. A nozzle according to clam 18, wherein said flap aft extensions are received within said flap seal aft extensions.

* * * * *